(12) United States Patent
Kuroki (10) Patent No.: US 6,805,986 B2
(45) Date of Patent: Oct. 19, 2004

(54) GASKET FOR FUEL BATTERY (75) Inventor: Yuichi Kuroki, Fujisawa (JP)

(73) Assignee: NOK Corporation, Tokyo (JP)

( * ) Notice: Subject to any disclaimer, the term of this patent is extended or adjusted under 35 U.S.C. 154(b) by 158 days.

(21) Appl. No.: 10/049,637

(22) PCT Filed: Jun. 26, 2001

(86) PCT No.: PCT/JP01/05470

§ 371 (c)(1),
(2), (4) Date: Feb. 25, 2002

(87) PCT Pub. No.: WO02/01659

PCT Pub. Date: Jan. 3, 2002

(65) Prior Publication Data

US 2003/0013000 A1 Jan. 16, 2003

(30) Foreign Application Priority Data

Jun. 27, 2000 (JP) ........................................ 2000-192302

(51) Int. Cl.[7] ............................ H01M 8/04; H01M 2/08
(52) U.S. Cl. ............................. 429/22; 429/23; 429/24; 429/35
(58) Field of Search .............................. 429/22, 23, 24, 429/25, 35; 361/750

(56) References Cited

U.S. PATENT DOCUMENTS

| | | | |
|---|---|---|---|
| 5,763,113 A | * | 6/1998 | Meltser et al. ............ 429/22 X |
| 5,853,910 A | * | 12/1998 | Tomioka et al. .......... 429/24 X |
| 6,242,690 B1 | * | 6/2001 | Glover .................... 361/752 X |
| 6,410,176 B1 | * | 6/2002 | Genc et al. ................ 429/23 X |

FOREIGN PATENT DOCUMENTS

| | | | | |
|---|---|---|---|---|
| GB | 2339060 | * | 1/2000 | ............ H01M/8/10 |
| JP | 4-39869 | | 2/1992 | ............ H01M/8/04 |
| JP | 60-236464 | | 11/1992 | ............ H01M/8/02 |
| JP | 5-159794 | | 6/1993 | ............ H01M/8/04 |
| JP | 2001-102072 | | 4/2001 | ............ H01M/8/02 |

* cited by examiner

*Primary Examiner*—Stephen J. Kalafut
(74) *Attorney, Agent, or Firm*—Jacobson Holman PLLC (57) ABSTRACT

In order to make it possible to specify a cell or a module generating an abnormality in a power generating performance (a voltage, a current and the like) without disassembling a fuel battery stack, a gasket for a fuel battery having gaskets on both surfaces of a print circuit for taking out an electric signal within the cell or the module is held between separators, and an electric signal take-out portion for taking out an electric signal (the voltage, the current and the like) is integrally assembled together with a seal.

9 Claims, 10 Drawing Sheets

GASKET FOR FUEL BATTERY

This is a nationalization of PCT/JP01/05470 filed Jun. 26, 2001 and published in Japanese.

FIELD OF THE INVENTION

The present invention relates to a gasket for a fuel battery which is used as a seal portion in the fuel battery.

BACKGROUND ART

About 100 to 400 sheets of separators (current collecting plates) are used in a stack for the fuel battery in correspondence to a number of lamination of unit cells. At this time, there are a case of simply laminating the cells so as to form the stack and a case of laminating modules, one unit of which is formed by a plurality of the cells, so as to form the stack. In the fuel battery stack mentioned above, in the case that the cell or the module does not normally operate, a reduction of a power generating efficiency, an abnormality or a trouble is caused. However, in the stack state, it has not been easily known which of the cells or modules generates a problem. For example, in the case that a voltage drop or a current reduction is generated due to a defect of the separator, a problem of an electrode, an abnormality of a fuel gas concentration, an abnormality of an electrolyte membrane or the like, it has been conventionally unknown which of the cells or modules the voltage drop or the current reduction is generated in. Accordingly, under the present circumstances, the stack is dissembled and the cells or the modules are checked by a tester one by one.

The present invention is made by taking the matters mentioned above into consideration, and an object of the present invention is to provide a gasket for a fuel battery which is provided with a function capable of performing an operation of specifying a cell or a module generating a voltage drop or a current reduction without disassembling a stack for a fuel battery, by directly measuring a voltage or a current of the cell or the module by a print circuit being electrically in contact with a separator, an a function of taking out an output of a gas sensor or a temperature sensor built in the cell or the module.

SUMMARY OF THE INVENTION

In order to achieve the object mentioned above, in accordance with a first aspect of the present invention, there is provided a gasket for a fuel battery characterized in that gaskets are provided on both surfaces of a print circuit for taking out an electric signal within a cell or a module.

Further, in accordance with a second aspect of the present invention, there is provided a gasket for a fuel battery as recited in the first aspect mentioned above, characterized in that the print circuit is a flexible print circuit.

Further, in accordance with a fifth aspect of the present invention, there is provided a gasket for a fuel battery characterized in that a detecting portion having a function of taking out an output of a gas sensor built in a cell or a module is integrally assembled.

Further, in accordance with a fourth aspect of the present invention, there is provided a gasket for a fuel battery as recited in the third aspect mentioned above, characterized in that the gasket has a substrate mounted to an electrolyte membrane of a reaction electrode portion, a flexible print circuit lapped over the substrate, an electrode provided in the flexible print circuit and being in contact with the separator, and a gasket fixed to the substrate and holding the flexible print circuit between the gasket and the substrate.

Further, in accordance with a fifth aspect of the present invention, there is provided a gasket for a fuel battery characterized in that a detecting portion having a function of taking out an output of a gas sensor build in a cell or a module is integrally assembled.

Further, in accordance with a sixth aspect of the present invention, there is provided a gasket for a fuel battery characterized in that a detecting portion having a function of taking out an output of a temperature sensor build in a cell or a module is integrally assembled.

Further, in accordance with a seventh aspect of the present invention, there is provided a gasket for a fuel battery characterized in that a signal line for taking out an electric signal within a cell or a module is integrally formed with a gasket substrate in accordance with a printing method or an etching method, and a gasket is integrally formed with the substrate.

Further, in accordance with an eighth aspect of the present invention, there is provided a gasket for a fuel battery as recited in the seventh aspect mentioned above, characterized in that the signal line takes out an electric signal of a current application diagnosis, a temperature, a gas or the like.

Further, in accordance with a ninth aspect of the present invention, there is provided a gasket for a fuel battery as recited in the seventh aspect mentioned above, characterized in that the gasket is formed in a double structure, the signal line is arranged between the gaskets, and an electrode is also arranged there.

Further, in accordance with a tenth aspect of the present invention, there is provided a gasket for a fuel battery as recited in any one of the first to ninth aspects mentioned above, characterized in that a front surface of a circuit formed in the substrate is coated with a protecting member constituted of an insulating membrane.

By measuring the voltage or the current between the separators at the print circuit terminal in a stack state formed by laminating a plurality of cells in which the gasket for the fuel battery with the print circuit in accordance with the present invention provided with the structure mentioned above is built, or by taking out the sensor output, it is possible to check only on connecting a tester to the detecting portion without dissembling the stack. As a particular structure of the detecting portion and the gasket, as described in the third aspect, it is preferable to have a substrate mounted to an electrolyte membrane of a reaction electrode portion, a flexible print circuit lapped over the substrate, an electrode provided in the flexible print circuit and being in contact with the separator, and a gasket fixed to the substrate and holding the flexible print circuit between the gasket and the substrate. The circuit portion may be formed by directly adhering a metal foil to the substrate or printing a conductive ink. Further, the present invention is structured such that the gasket for the fuel battery having the gaskets on both surfaces of the print circuit for taking out the electric signal within the cell or the module is held between the separators, and the electric signal take-out portion for taking out the electric signal (the voltage, the current or the like) is integrally assembled with the seal.

Further, as the gasket for a fuel battery in accordance with the sixth aspect of the present invention provided with the structure mentioned above, in the case that the signal line for taking out the electric signal within the cell or the module is integrally formed with the gasket substrate in accordance with the printing method or the etching method, an occupying space is hardly expanded in comparison with the structure having no signal line, so that it is possible to provide the gasket which saves space and has an excellent practicability in this view.

In this case, the following technical matters are included in the present application.

(1) That is, at first, in order to achieve the object mentioned above, one gasket proposed by the present application is a gasket with a print circuit used in the stack for the fuel battery. When the print circuit is the flexible print circuit, it is advantageous to make the structure thin.

(2) Further, the substrate is made of a heat-resistant resin sheet such as a polyimide (PI), a polyether nitrile (PEN), a polyethylene terephthalate (PET), an epoxy-based resin, a phenol-based resin or the like, and the circuit portion is formed by using a conductive ink, a copper, a nickel, a stainless steel, a titanium, a tungsten, a gold, a Permalloy, a Nichrome, an aluminum foil or the like. In this case, the metal foil or the like such as the copper or the aluminum which is easily corroded by an electrolyte solution or the like can be covered by a metal having a corrosion resistance, an alloy thereof, a metallic compound or a coating material. Next, the gasket is arranged in the print circuit substrate so as to constitute the seal member. The arrangement is executed by a method of using an adhesive agent at a time of forming the gasket, a method of arranging on the basis of an adhesive property of the seal member itself, or a method of arranging after forming the seal member. In this case, the seal member is made of a saturated rubber such as a silicone rubber, a fluoro silicone rubber, an ethylene propylene rubber, a fluorine-contained rubber, a butyl rubber, a hydrogenation isoprene rubber, a hydrogenation butadiene rubber, a hydrogenation styrene butadiene rubber, a hydrogenation styrene isoprene rubber, an acrylic rubber, an ethylene acrylic rubber, a fluoro acrylic rubber, a styrene-based rubber, a hydrogenation styrene isoprene rubber and the like, or a liquid rubber thereof, a block type thermoplastic elastomer such as a styrene-butadiene styrene block copolymer, a styrene-isoprene styrene block copolymer and the like or a thermoplastic elastomer obtained by hydrogenating an unsaturated bonding portion thereof, a thermoplastic elastomer such as a polyester-base thermoplastic elastomer, an olefin-based elastomer and the like. In this case, when the seal member has an adhesive property to a circuit board, it is possible to fix the gasket to the circuit board without using the adhesive agent, so that this structure is preferable. A self-adhesive gasket mentioned above can be satisfied by introducing a functional group, for example, a carboxyl group, a hydroxyl group, a ketone or an imide to a part of a chemical structure of the seal member or blending an adhesive agent component to the seal member. In this case, since the adhesive property has a preferable combination in correspondence to the natures of the seal member and the circuit board, it may be suitably selected. Further, a seal member which is selectively adhered only to the substrate without being adhered to a molding die, that is, a seal member having a selective adhesion property is more preferable. For example, a selective adhesive silicone rubber or the like can be listed tip. In this case, on the front surface of the circuit formed in the substrate, it is possible to cover all the front surface except a circuit portion or a terminal front end portion by a protecting member as occasion demands. The protecting member may be any material forming an insulative membrane, however, normally a material similar to the substrate or selected from materials having a good adhesive property with respect to the seal member is used. When using a polyethylene terephthalate having a small coefficient of permeability for the gas and the liquid, that is, having an excellent sealing property for the circuit board, and using a member having the same property as the polyethylene terephthalate for the coating member, the substrate and the coating member are firmly bonded due to a thermo compression bonding, so that the electrolyte solution or the like is hard to permeate into the circuit portion, and in addition to a corrosion preventing effect in the circuit portion of the circuit board between the circuit board and the coating member, it is possible to expect an effect capable of preventing a warp due to a difference of thermal expansion between the substrate portion and the circuit portion. Further, the materials is not necessarily of same kind and different kinds of materials may be employed, as far as there is an affinity between the substrate material and the coating material.

(3) Both of the structures (1) and (2) mentioned above are the gasket arranged between the separators, and the print circuit is used for the purpose of detecting the voltage or the current of the separator.

(4) By placing the electrode for the purpose of checking a change of the voltage or the current of the separator, and the print circuit for the purpose of outputting the signal from the electrode, in the gasket used between the separators, the structure is made such that it is possible to check which of the cells or modules the voltage drop or the current reduction is generated in, from the external portion.

(5) Accordingly, it is possible to check the problem without dissembling the stack by checking the print circuit with respect to which of the cells has become abnormal in a state of the stack assembly.

(6) The fifth aspect mentioned above makes it possible to measure a concentration of hydrogen supplied to the cell for the fuel battery from an external portion of the cell, by using a sensor for measuring the concentration.

(7) Further, the sixth aspect mentioned above makes it possible to measure a temperature of an inner portion of the cell for the fuel battery froman external portion of the cell, by using a sensor for measuring the temperature.

Further, in connection with the inventions as recited in the seventh to ninth aspects mentioned above, the following technical matters are included in the present application.

(8) That is, in order to achieve the object mentioned above, one gasket proposed by the present application is a cell seal for a fuel battery, a signal line is integrally formed in a frame of the cell seal in accordance with a printing or the like, by a gasket being integrally formed with a signal line for taking out an electric signal within the cell.

(9) Further, in a cell seal for a fuel battery, a signal line is integrally formed in a frame of the cell seal in accordance with a printing or the like, by a gasket being integrally formed with a signal line for taking out an electric signal within the cell, and at least one signal line is provided.

(10) Further, in the seal recited in the item (8) mentioned above, the seal is provided for the purpose of takingout anelectric signal of a current application diagnosis, a temperature, a gas or the like.

(11) Further, in the seal recited in the item (8) mentioned above, beads of the cell seal are made in a double structure, the signal line is arranged between the beads, and the electrode is arranged.

(12) Further, in the case of using the cell seal obtained by forming the seal in the frame of the resin or the like, the structure is characterized that the signal line is arranged in the frame in accordance with a printing, an etching or the like and the seal is integrally formed in the frame in which the signal line and the resin frame are integrally formed, whereby even in the case of having the signal line, it is possible to secure the same space and assembling property as those of the seal having no signal line, and a cost increase can be restricted only to that for printing the signal line.

(13) Further, not only the electric signal for the voltage, the current or the like, but also signal lines for a hydrogen gas sensor and a temperature sensor are arranged in parallel orby use, whereby the structure can comply with respective needs.

(14) As an embodiment, a sheet in which a pressure sensitive heat sensitive adhesive agent (PSA: silicone based) is applied to the structure obtained by printing the carbon electrode and the signal line on the PET film and mold release paper attached thereto is produced, and is punched in a frame shape by a punching mold, followed forming a selective adhesive silicone rubber (SHINETSU CHEMICAL CO., LTD: X-34-1277A/B) by a liquid injection molding machine. The product is called a frame type (or carrier type) cell seal, is attached to the MEA in which the electrode is mounted to an ion exchange membrane after peeling the mold release paper in the frame type seal and is thereafter mounted by applying a heat and a pressure. In the case of assembling in the cell, it is possible to monitor a current application state of the GDL by assembling so as to align with the GDL.

(15) Further, as another embodiment, in the structure mentioned above, by making the cell seal portion in the double bead shape, the signal line is arranged between the beads, and further the electrode is arranged so as to be in contact with the signal line. The electrode is made of a conductive material such as a conductive rubber, a carbon or the like.

(16) In accordance with the structure mentioned above, since the signal line is printed in the frame for the purpose of mounting the seal to the ion exchange membrane, the space is not expanded and man hours for assembling can be reduced, so that it is possible to produce with only a cost increase corresponding to the signal line printing cost, in comparison with the cell seal having no signal line for the diagnosis monitor.

DETAILED DESCRIPTION OF THE PREFERRED EMBODIMENT

Next, a description will be given of embodiments in accordance with the present invention with reference to the accompanying drawings.

Figure 1:
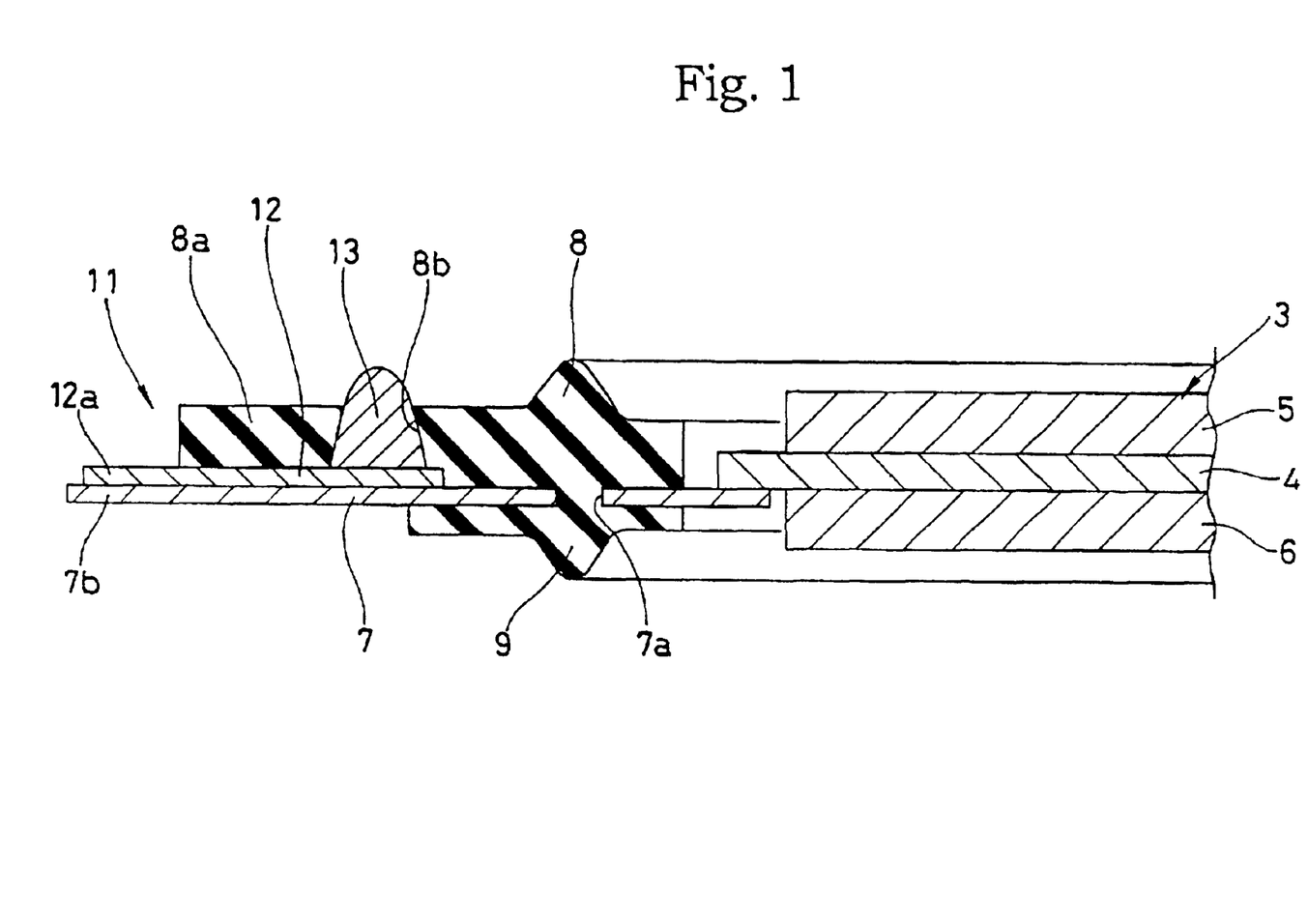
FIG. 1 is a cross sectional view of a gasket for a fuel battery in accordance with a first embodiment of the present invention.
Figure 2:
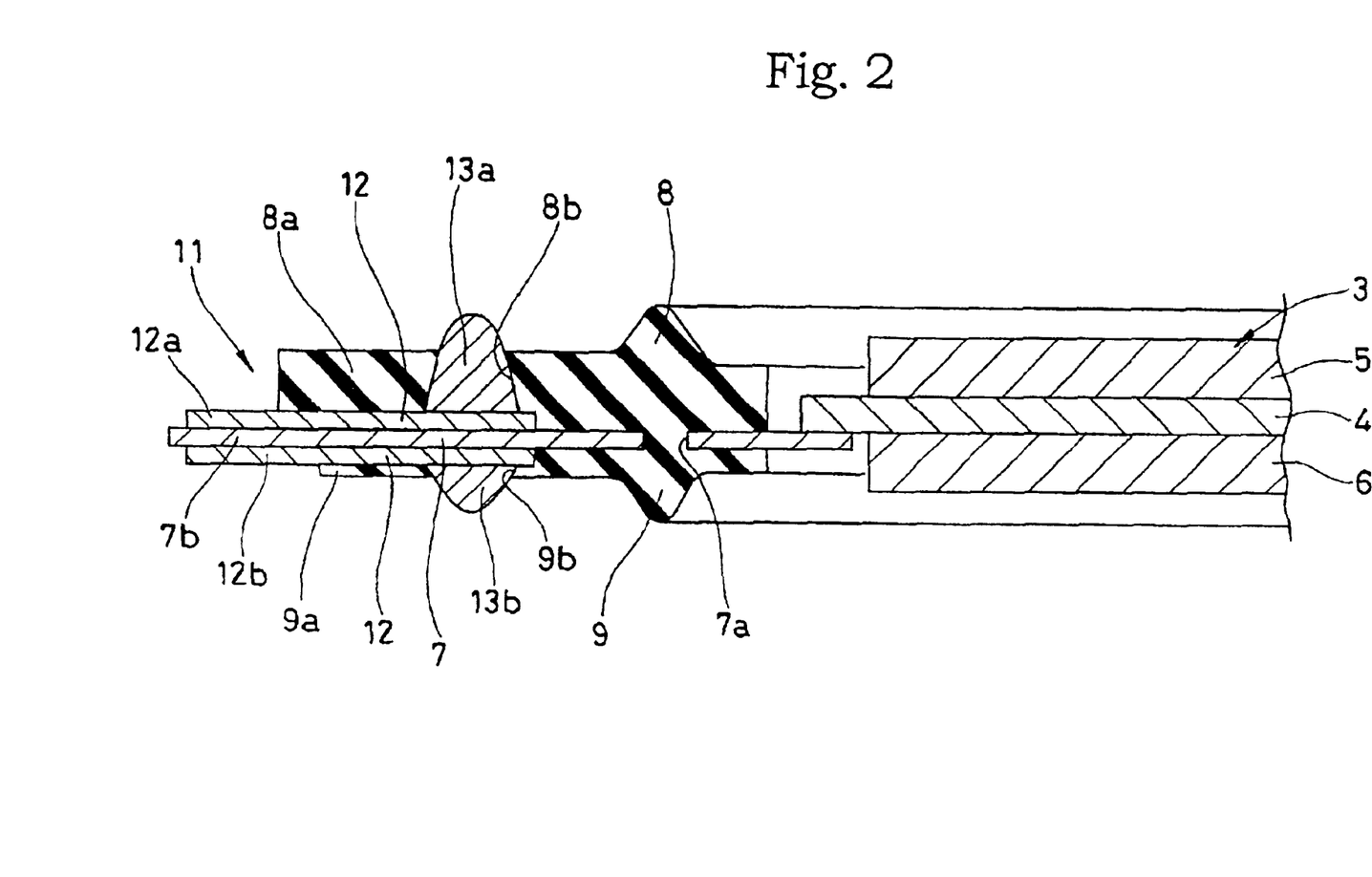
FIG. 2 is a cross sectional view of a gasket for a fuel battery in accordance with a second embodiment of the present invention.
Figure 3:
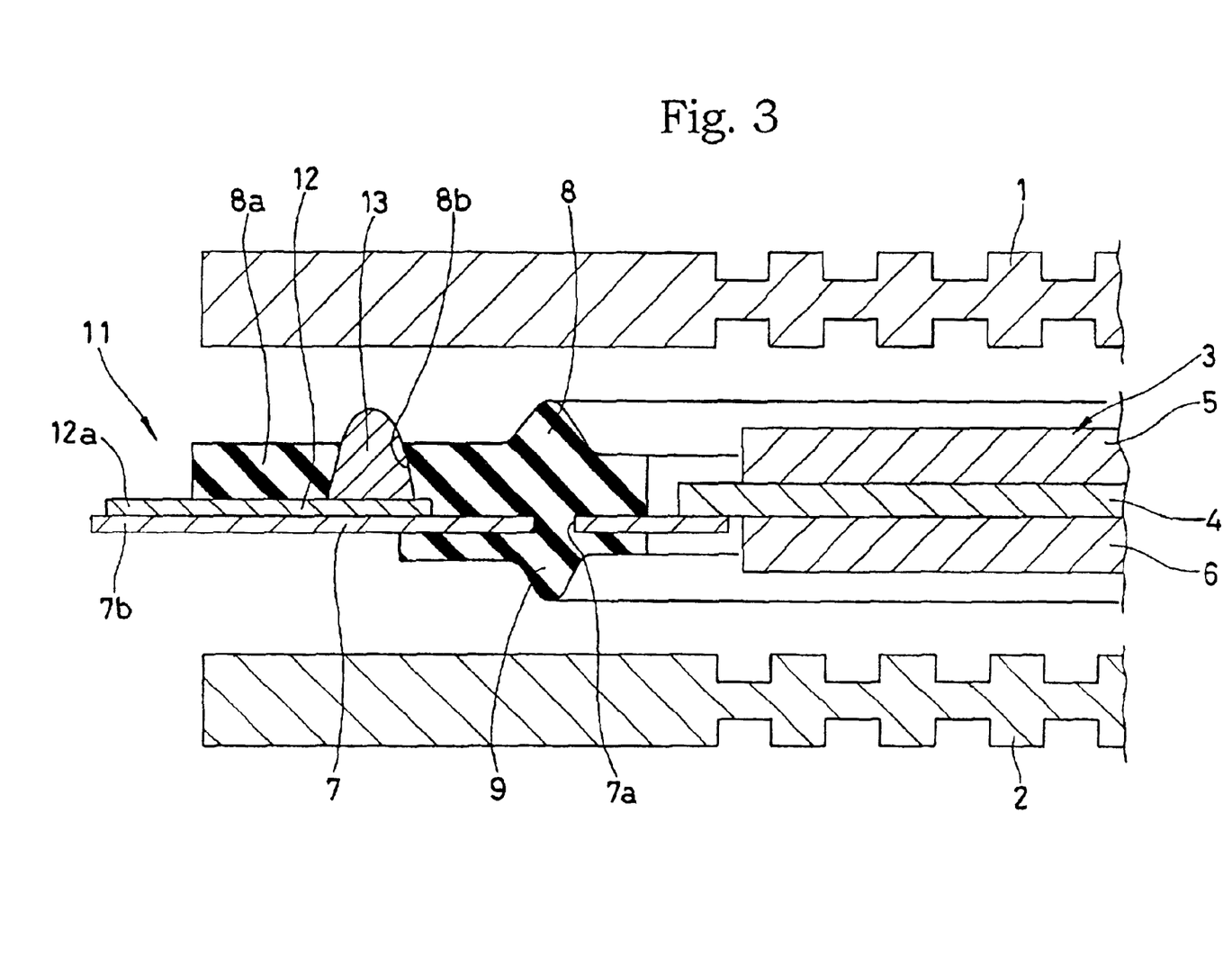
FIG. 3 is a cross sectional view showing an assembled cell state of the gasket for the fuel battery in accordance with the first embodiment of the present invention.
Figure 4:
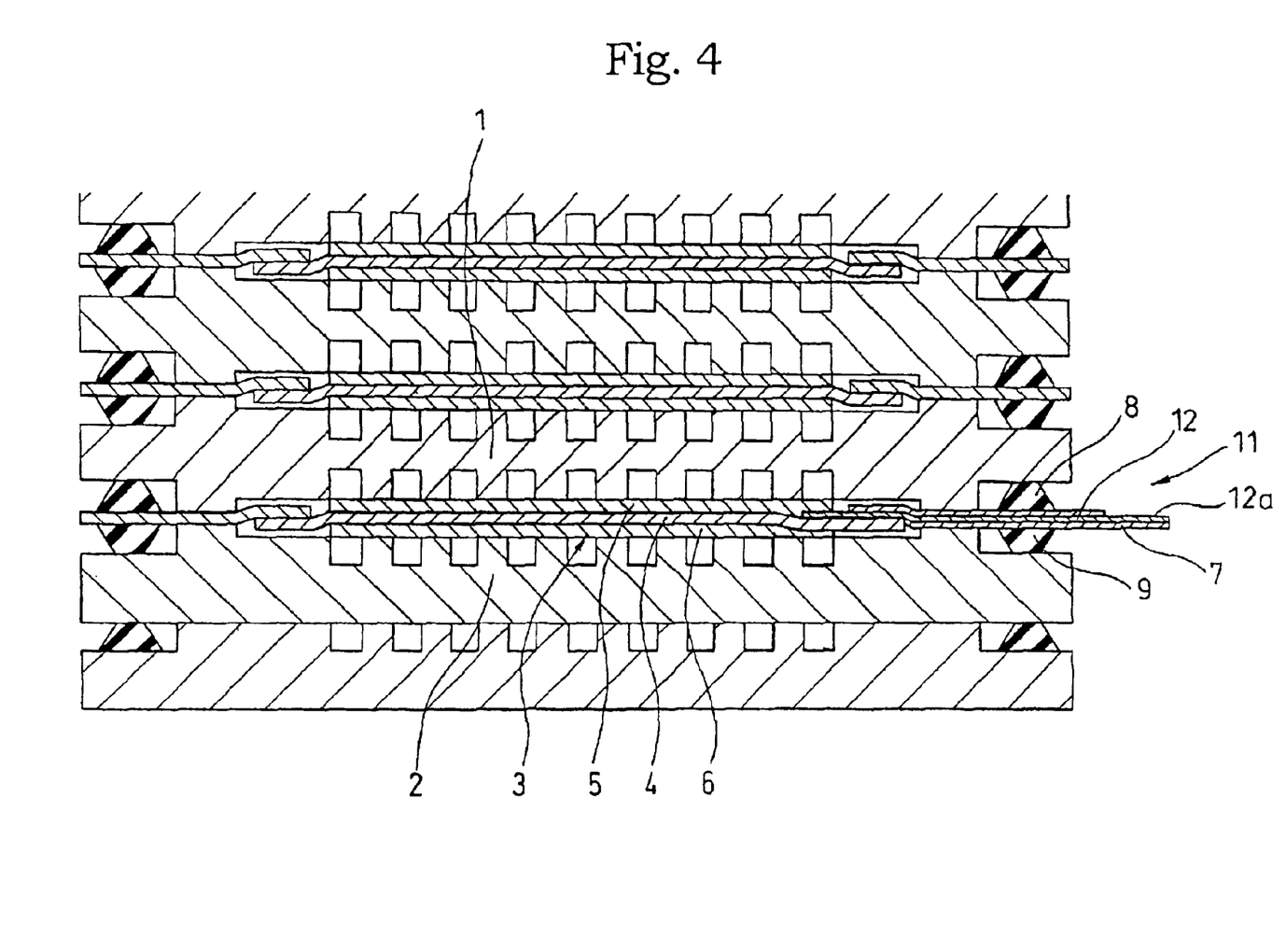
FIG. 4 is a cross sectional view showing an assembled module state of the gasket for the fuel battery in accordance with the first embodiment of the present invention.
Figure 5:
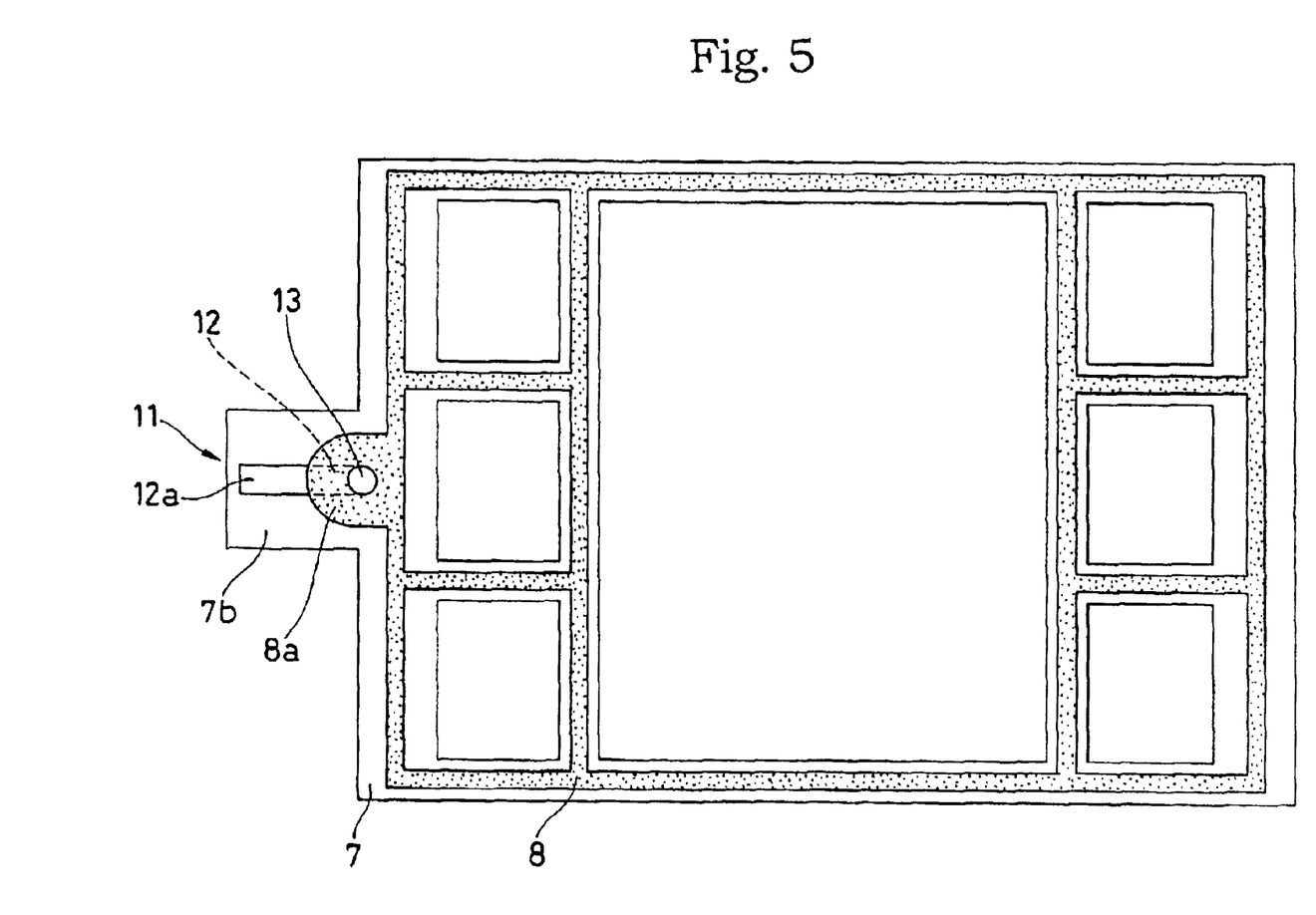
FIG. 5 is a plan view of a substrate.

FIGS. 1 and 2 respectively show a cross section of a gasket for a fuel battery in accordance with embodiments of the present invention. In FIG. 1, a circuit is formed on one surface of a substrate 7, and an electrode 13 is attached to one surface. In some cases, the electrode 13 may be attached to both surfaces by forming a hole in the substrate 7. In FIG. 2, the circuit is formed on both surfaces of the substrate 7, and electrodes 13a and 13b are attached to the respective surfaces. A state after assembling the structure shown in FIG. 1 is shown in FIGS. 3 and 4. FIG. 3 is a view after assembling the gasket shown in FIG. 1, and FIG. 4 shows an embodiment of a module unit in which one gasket is provided in a plurality of cells without being provided in each of the cells. Further, FIG. 5 is a plan view of the substrate 7. The assembled structure shown in FIGS. 3 and 4 constructs a cell for a fuel battery corresponding to an assembled complete product, and is structured as follows.

That is, at first, a pair of upper and lower separators 1 and 2 laid over each other are provided, and a reaction electrode portion (MEA) 3 is held between a pair of separators 1 and 2. The reaction electrode portion 3 is structured such that a positive electrode (GDL: an electrode having a gas diffusion layer) 5 and a negative electrode (GDL: an electrode having a gas diffusion layer) 6 are overlapped on both upper and lower sides of an electrolyte membrane (an ion exchange membrane) 4.

A substrate (frame) 7 is attached to a peripheral edge portion of the electrolyte membrane 4 in the reaction electrode portion 3 by means of an adhesion or the like, and gaskets (seal rubbers) 8 and 9 are fixed to both upper and lower sides of the substrate 7. The upper gasket 8 is closely attached to a lower surface of the upper separator 1 with a predetermined compression margin, and the lower gasket 9 is closely attached to an upper surface of the lower separator 2 with a predetermined compression margin, whereby both of the gaskets 8 and 9 seal between a pair of separators 1 and 2. In this case, both of the illustrated gaskets 8 and 9 are integrally formed with each other via a communication portion 7a provided in the substrate 7 so as to form a through hole shape. However, they may be separately provided in upper and lower portions without the communication portion 7a. The substrate 7 is formed with a heat-resistant resin sheet or the like made of a polyimide, a polyether nitrile, a polyethylene terephthalate, an epoxy-based resin, a phenol-based resin or the like, and the gaskets 8 and 9 are formed with a saturated rubber or the like such as a silicone rubber, a fluorine-contained rubber, an ethylene propylene rubber and the like.

A detecting portion (also called as an electric signal take-out portion) 11 for detecting electric signals (voltages or currents) of the separators 1 and 2 in a state of combining a plurality of cells so as to form a stack is provided at a position outside the gaskets 8 and 9. The detecting portion 11 is structured in a manner mentioned below.

That is, at first, in the embodiment shown in FIG. 1, a flexible print circuit 12 is overlapped on the upper surface of the substrate 7 in an unbonded manner, and a membrane-like coating portion 8a integrally formed with the upper gasket 8 covers the flexible print circuit 12 in an unbonded manner. Accordingly, the flexible print circuit 12 is held between the substrate 7 and the coating portion 8a so as to form a sandwich structure. Further, the electrode 13 is placed on the upper surface of the flexible print circuit 12, the electrode 13 protrudes upward from the communication portion 8b formed in the coating portion 8a in the through hole shape, and is in contact with the lower surface of the upper separator 1. The flexible print circuit 12 is formed with a foil made of Cu, Ni, Ag, Au or the like, or a conductive ink or the like, and the electrode 13 is formed by a conductive rubber, a conductive resin, a carbon or the like.

The substrate 7 partly protrudes in a part thereof outside the flat shape of the upper and lower separators 1 and 2, and a part of the flexible print circuit 12 which is not covered by the coating portion 8a is arranged in a protruding portion 7b of the substrate 7. This part of the flexible print circuit 12 forms a measurement terminal portion 12a with which a tester for detecting an electric signal is to be in contact, and it is possible to detect the electric signal of the separator and the cell by contacting the tester with the terminal portion 12a.

Accordingly, in accordance with the gasket and the cell or the module provided with the electric signal take-out portion 11, it is possible to detect the voltage or the current of the separators 1 and 2 and the cell or the module only by connecting the tester to the contact portion 12a without dissembling the stack.

Further, in the embodiment shown in FIG. 2, the flexible printcircuits 12 are respectively overlapped on both upper and lower surfaces of the substrate 7 in an unbonded state, the membrane-like coating portion 8a integrally formed with the upper gasket 8 covers the upper flexible print circuit 12 in an unbonded state, and a membrane-like coating portion 9a integrally formed with the lower gasket 9 covers the lower flexible print circuit 12 in an unbonded state. Accordingly, both of the flexible print circuits 12 are held between the substrate 7 and the coating portions 8a and 9a in a sandwich shape. Further, the electrodes 13a and 13b are respectively placed on the upper surface of the upper flexible print circuit 12 and the lower surface of the lower flexible print circuit 12, and the electrodes 13a and 13b protrude upward or downward from the communication portions 8b and 9b formed in the coating portions 8a and 9a in the through hole shape so as to be in contact with the lower surface of the upper separator 1 or the upper surface of the lower separator 2. The flexible print circuit 12 is formed with a foil made of Cu, Ni, Ag, Au or the like, or a conductive ink or the like, and the electrodes 13a and 13b are formed with a conductive rubber, a conductive resin, a carbon or the like.

The substrate 7 partly protrudes in a part thereof outside the flat shape of the upper and lower separators 1 and 2, and a part of the flexible print circuit 12 which is not covered by the coating portions 8a and 9a is arranged in a protruding portion 7b of the substrate 7. This part of the flexible print circuit 12 forms measurement terminal portions 12a and 12b with which a tester for detecting an electric signal is to be in contact, and it is possible to detect the electric signal of the separator and the cell by contacting the tester with the terminal portions 12a and 12b.

Accordingly, in accordance with the gasket and the cell or the module provided with the electric signal take-out portion 11, it is possible to detect the voltage or the current of the separators 1 and 2 and the cell or the module only by connecting the tester to the contact portions 12a and 12b without dissembling the stack.

Figure 6:
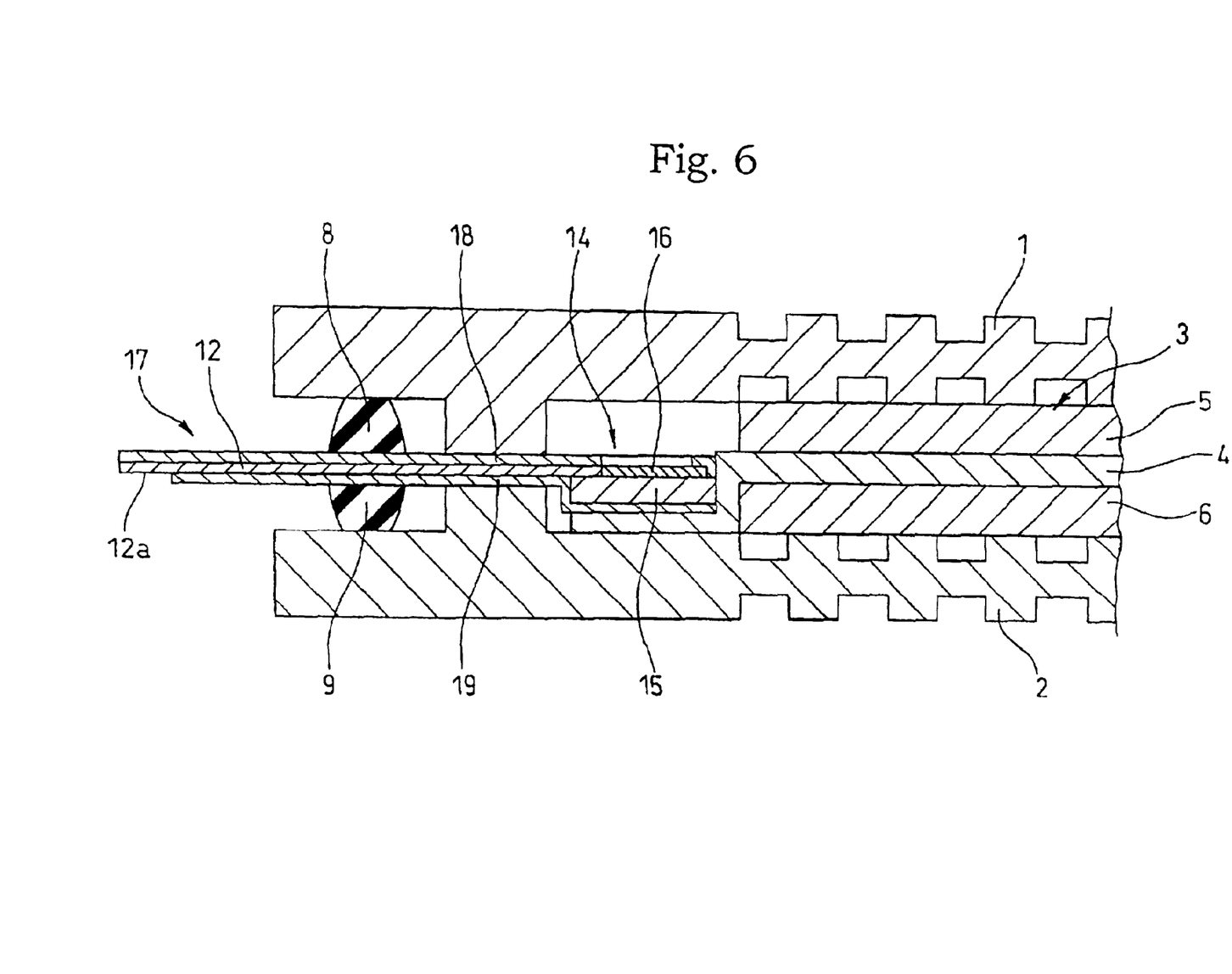
FIG. 6 is a cross sectional view of a gasket for a fuel battery in accordance with a third embodiment of the present invention.

FIG. 6 shows an embodiment of an invention in accordance with the fifth aspect of the present application. The structure is made such that it is possible to measure from an external portion of the cell or the module on the basis of a similar structure to the embodiment mentioned above, by using a gas sensor (also called a hydrogen sensor) 14 for measuring a concentration of hydrogen supplied to the cell for the fuel battery mentioned above.

The gas sensor 14 is, for example, of a type of constructing a bridge of palladium 16 on a alumina substrate 15 having a thickness of 0.25 mm and a size of 5 mm square and detecting a concentration of hydrogen due to a bridge voltage change caused by the hydrogen attached to the palladium 16, and a measurement terminal portion 12a protrudes outward via the flexible print circuit 12 so as to form a detecting portion 17. Reference numerals 18 and 19 respectively denote a PI film.

Figure 7:
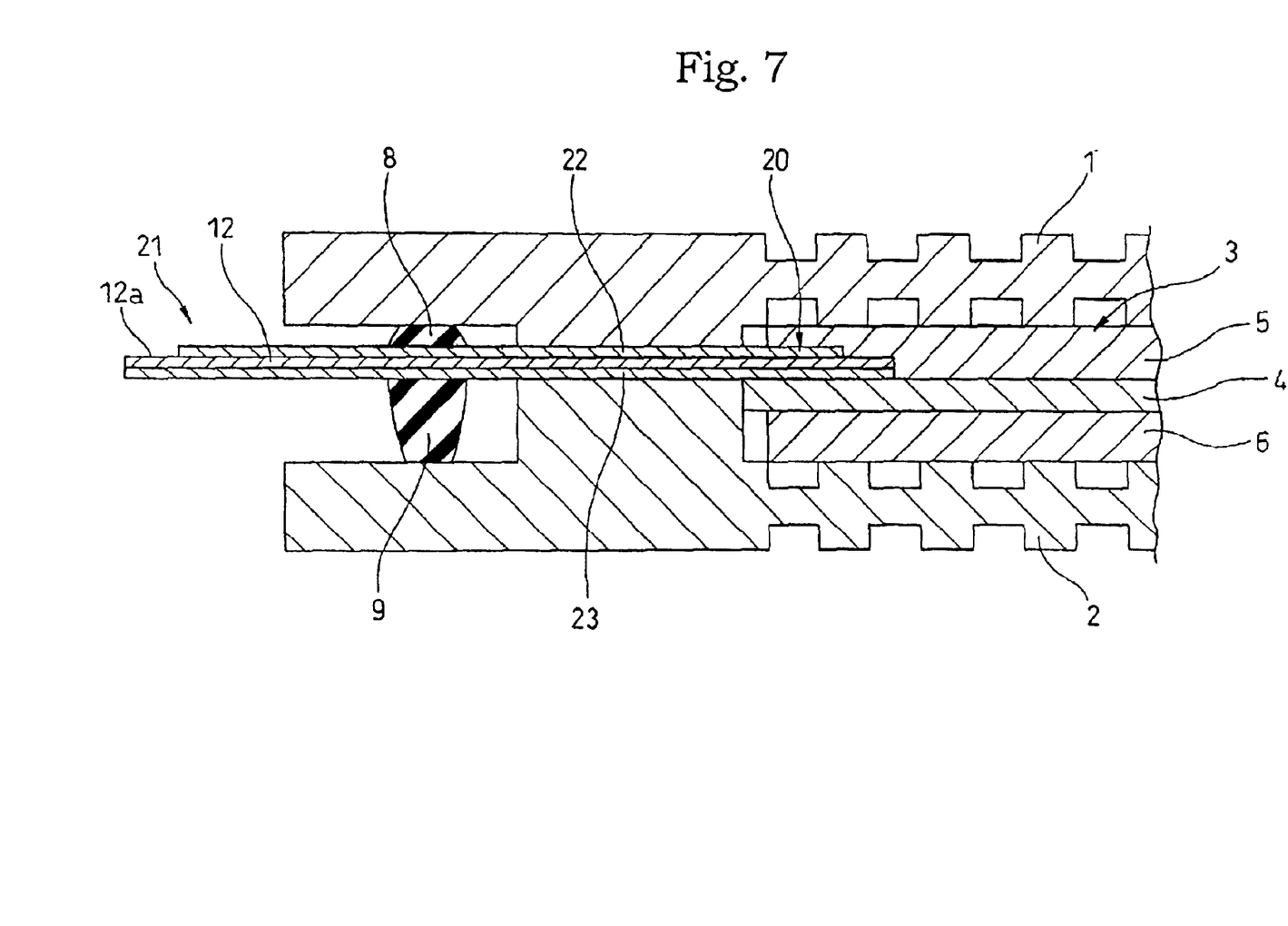
FIG. 7 is a cross sectional view of a gasket for a fuel battery in accordance with a fourth embodiment of the present invention.

Further, FIG. 7 shows an embodiment of an invention in accordance with the sixth aspect of the present application. The structure is made such that it is possible to measure from an external portion of the cell or the module on the basis of a similar structure to the embodiment mentioned above, by using a temperature sensor 20 for measuring a temperature of an inner portion of the cell for the fuel battery mentioned above.

The temperature sensor 20 is structured, for example, such that a flattened so-called thermo couple is printed on the flexible print circuit 12 so as to form a sensing portion, and a measurement terminal portion 12a protrudes outward so as to form a detecting portion 21. Reference numerals 22 and 23 respectively denote a PI film.

Figure 8:
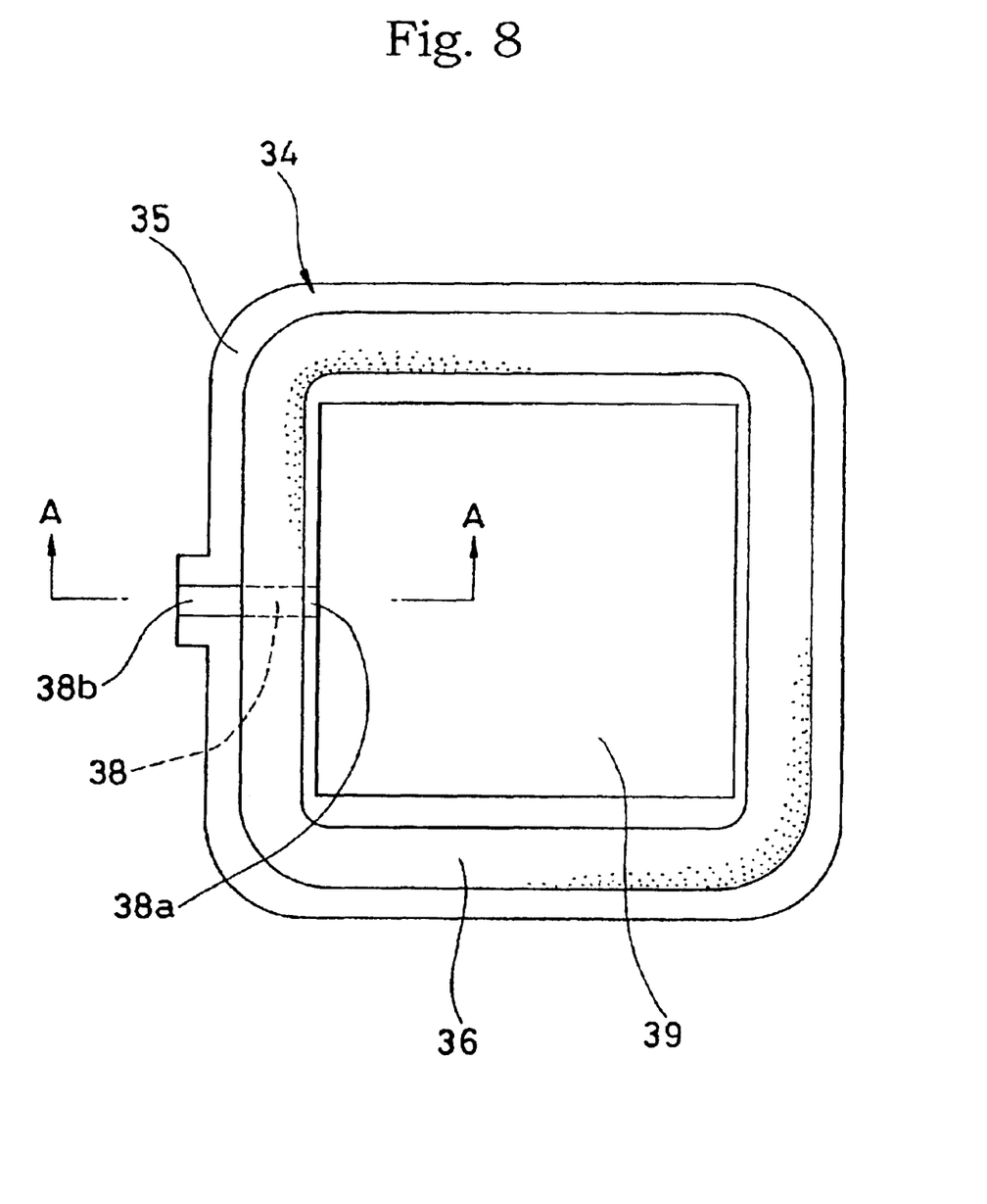
FIG. 8 is a plan view of a gasket for a fuel battery in accordance with a fifth embodiment of the present invention.
Figure 9:
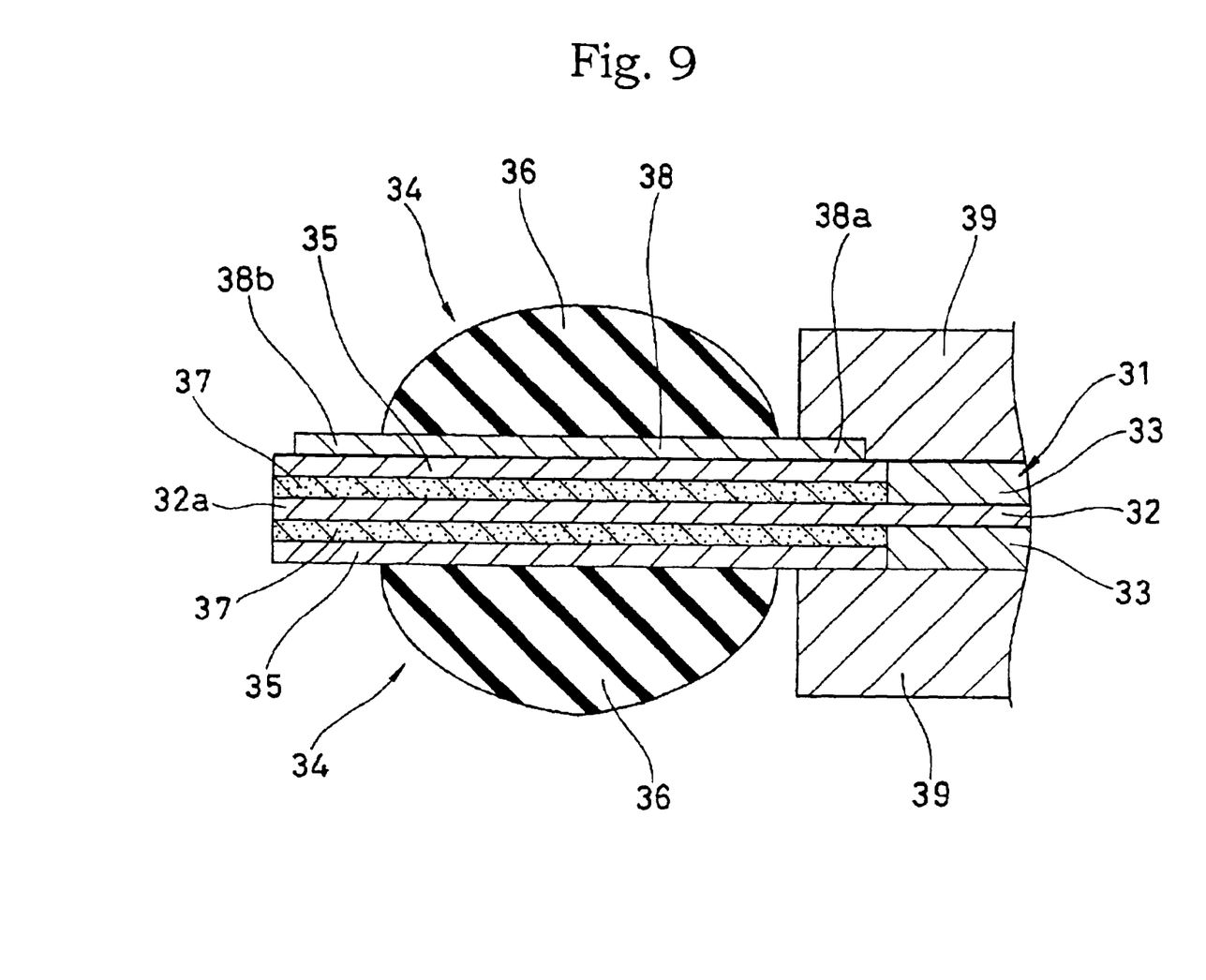
FIG. 9 is an enlarged cross sectional view along a line A—A in FIG. 8.

Further, FIGS. 8 and 9 show an embodiment of an invention in accordance with the seventh aspect of the present application, and the embodiment is structured as follows.

That is, as shown in a cross sectional view in FIG. 9, catalysts 33 are overlapped on both upper and lower sides of an electrolyte membrane (an ion exchange membrane) 32 to provide a reaction electrode portion (MEA) 31 and cell seals 34 are respectively provided on both upper and lower sides of a peripheral edge portion 32a in the electrolyte membrane 32.

Each of the cell seals 34 is obtained by integrally forming a gasket (bead) 36 made of rubber such as a selective adhesive silicone rubber or the like on one surface of a gasket substrate (frame) 35 made of a resin such as a PET film or the like and applying an adhesive agent 37 made of a PSA or the like on another surface of the substrate 35, and is bonded to the peripheral edge portion 32a of the electrolyte membrane 32 by the adhesive agent 37. The gasket 36 is provided with an inner peripheral side gasket 36A and an outer peripheral side gasket 362 so as to be structured as an inner and outer double structure.

A signal line 38 is integrally formed on the upper substrate 35 in the drawing by an integrally forming means on the basis of a printing method or an etching method prior to forming the gasket 36. The signal line 38 is in contact with an electrode (GDL: an electrode having a gas diffusion layer) 39 at one end portion 38a thereof after assembling the cell, and outputs an electric signal from another end portion 38b so as to measure the voltage or the current within the cell. Since the signal line 38 is integrally formed with the substrate 35, it is possible to realize a space saving.

Figure 10:
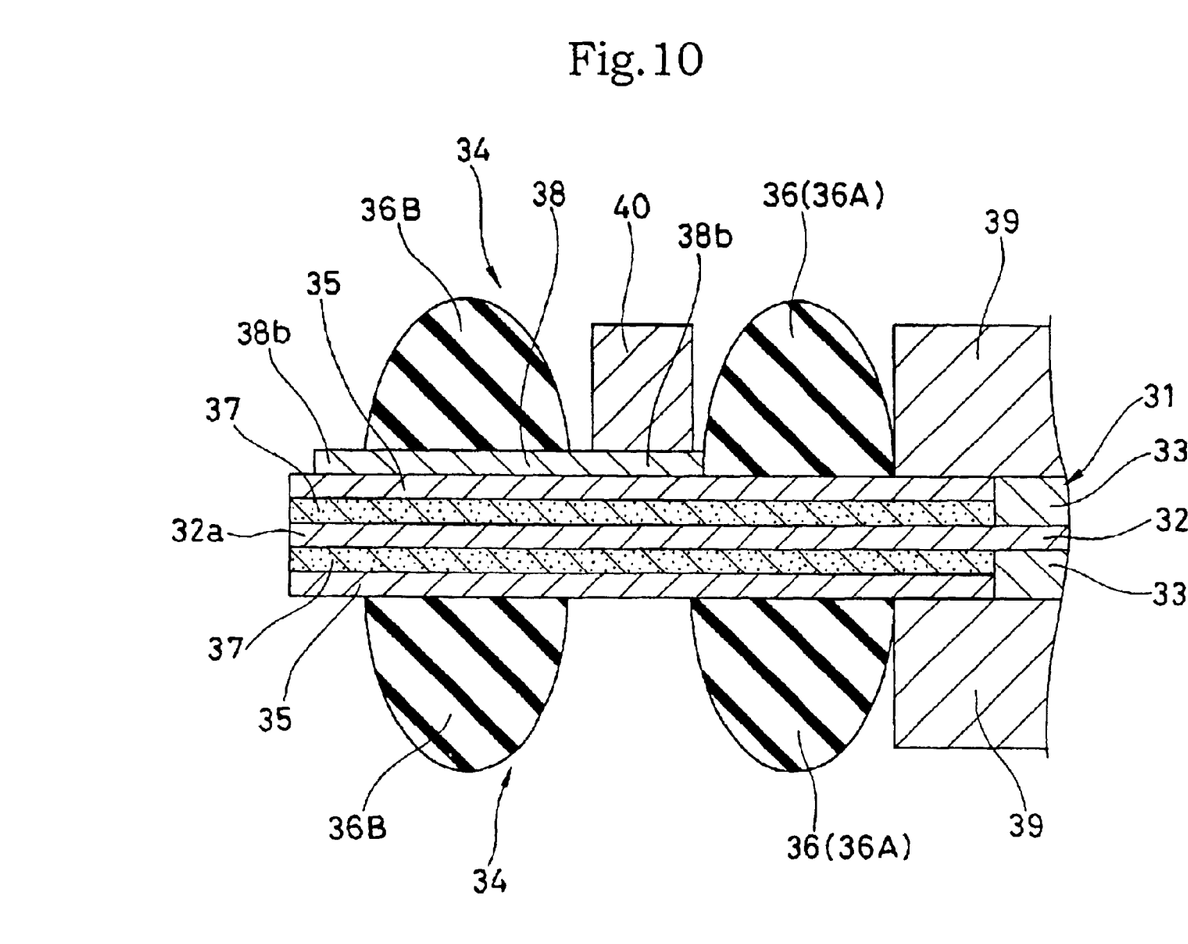
FIG. 10 is a plan view of a gasket for a fuel battery in accordance with a sixth embodiment of the present invention.

Further, FIG. 10 shows an embodiment of an invention in accordance with the ninth aspect of the present application, and the embodiment is structured as follows.

That is, catalysts 33 are overlapped on both upper and lower sides of an electrolyte membrane (an ion exchange membrane) 32 to provide a reaction electrode portion (MEA) 31, and cell seals 34 are respectively provided on both upper and lower sides of a peripheral edge portion 32a in the electrolyte membrane 32.

Each of the cell seals 34 is obtained by integrally forming a gasket (bead) 36 made of a rubber such as a selective adhesive silicone rubber or the like on one surface of a gasket substrate (frame) 35 made of a resin such as a PET film or the like and applying an adhesive agent 37 made of a PSA or the like on another surface of the substrate 35, and is bonded to the peripheral edge portion 32a of the electrolyte membrane 32 by the adhesive agent 37. The gasket 36 is provided with an inner peripheral side gasket 36A and an outer peripheral side gasket 36B so as to be structured as an inner and outer double structure.

A signal line 38 is integrally formed on the upper substrate 35 in the drawing by an integrally forming means on the basis of a printing method or an etching method prior to forming the gasket 36. One end portion 38a of the signal line 38 is arranged between the inner and outer gaskets 36A and 36B, and an electrode 40 is mounted to this one end portion 38a. Accordingly, after assembling the cell, the electrode 40 is in contact with the separator (not shown) and outputs an electric signal from another end portion 38b of the signal line 38 so as to measure the voltage or the current within the cell. In accordance with this embodiment, since the signal line 38 is integrally formed with the substrate 35, it is possible to realize a space saving.

Effect of the Invention and Industrial Applicability

The present invention obtains the following effects.

That is, at first, in the gasket for the fuel battery in accordance with the first to fourth aspects of the present invention provided with the structure mentioned above, since the detecting portion for taking out the electric signal of the separator and the cell or the module in a state of combining a plurality of cells or modules so as to form the stack is integrally assembled in the gasket, it is possible to detect the electric signal only by connecting the tester to the detecting portion without disassembling the stack, whereby it is possible to easily know from the external portion which of the cells or modules the voltage drop or the current reduction is generated in.

Further, in the gasket for the fuel battery in accordance with the fifth aspect of the present invention provided with the structure mentioned above, it is possible to easily measure the concentration of the hydrogen supplied to the cell for the fuel battery from the external portion without dissembling the stack, and in the gasket for the fuel battery in accordance with the sixth aspect of the present invention, it is also possible to easily measure the temperature of the inner portion of the cell for the fuel battery from the external portion without dissembling the stack.

Further, in the gasket for the fuel battery in accordance with the seventh to ninth aspects of the present invention provided with the structure mentioned above, in addition to the same operations and effects as those of the gasket in accordance with the first to fourth aspects mentioned above, since the signal line is integrally formed with the substrate, an occupying space is not expanded so much in comparison with the structure having no signal line. Accordingly, it is possible to realize a space saving of the fuel batter and the seal portion thereof while providing with the detecting function mentioned above.

Further, in the gasket for the fuel battery in accordance with the tenth aspect of the present invention provided with the structure mentioned above, since the structure is made such that the front surface of the circuit formed on the substrate is covered by the protecting member constituted of by the insulative membrane, it is possible to obtain the effect of preventing corrosion in the circuit portion, and the effect of preventing warp de to the difference of thermal expansion between the substrate portion and the circuit portion.

What is claimed is:

1. A fuel battery comprising
   a flexible print circuit, and
   gaskets provided on both surfaces of the flexible print circuit for sampling an electric signal of the flexible print circuit from within a cell or a module.

2. A fuel battery comprising
   a pair of separators, and
   a detecting portion for detecting a voltage or a current of a cell or a module by being electrically connected to at least one of the pair of separators when combining a plurality of cells or modules so as to form an integrally assembled stack.

3. The fuel battery as claimed in claim 2, further comprising a substrate connected to an electrolyte membrane of a reaction electrode portion, a flexible print circuit lapped over said substrate, an electrode provided in the flexible print circuit in contact with one of the pair of separators, and a gasket fixed to the substrate and holding the flexible print circuit between the gasket and the substrate.

4. A fuel battery comprising
   a flexible print circuit,
   gaskets provided on both surfaces of the flexible print circuit for sampling an output of a gas sensor integrally assembled in a cell or a module.

5. A fuel battery comprising
   a flexible print circuit
   gaskets provided on both surfaces of the flexible print circuit for sampling an output of a temperature sensor integrally assembled in a cell or a module.

6. A fuel battery comprising
   a signal line for providing an electric signal within a cell or a module being integrally formed with a substrate, and
   a gasket integrally formed with the substrate.

7. The fuel battery as claimed in claim 6, wherein the signal line provides an electric signal for one of a current application diagnosis, a temperature and a gas.

8. The fuel battery as claimed in claim 6, wherein the gasket is formed in a double structure of separated gasket portions, and the signal line is arranged between the gasket portions, and an electrode being located between the gasket portions.

9. The fuel battery as claimed in claim 6, wherein a front surface of a circuit formed in the substrate is coated by a protecting member constituted by an insulating membrane.

* * * * *